May 21, 1968  A. L. POTTER, JR., ET AL  3,384,495
SNACK FOOD IN THE SHAPE OF A SCOOP HAVING A FLAT BLADE
AND A CYLINDRICAL HOLLOW HANDLE
Filed Oct. 16, 1963

A.L. POTTER Jr, M.L. BELOTE,
& H.K. BURR.

INVENTORS

BY

ATTORNEYS

United States Patent Office 3,384,495
Patented May 21, 1968

3,384,495
SNACK FOOD IN THE SHAPE OF A SCOOP HAVING A FLAT BLADE AND A CYLINDRICAL HOLLOW HANDLE
Archibald L. Potter, Jr., Berkeley, Mary L. Belote, Albany and Horace K. Burr, El Cerrito, Calif., assignors to the United States of America as represented by the Secretary of Agriculture
Filed Oct. 16, 1963, Ser. No. 316,779
6 Claims. (Cl. 99—100)

ABSTRACT OF THE DISCLOSURE

Preparation of a snack food by rolling dough into a thin sheet, cutting the dough into a blank in the shape of a paddle having a blade and a handle section, perforating the blank solely in the blade section, baking the perforated dough blank to yield a product which has a flat blade section and a puffed handle section.

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel food products. Further objects and advantages of the invention will be evident from the following description wherein parts and percentages are by weight unless otherwise specified.

Figure 1:
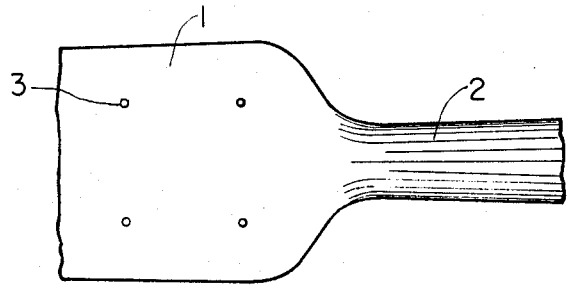
Figure 2:
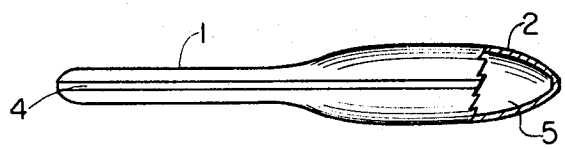
Figure 3:
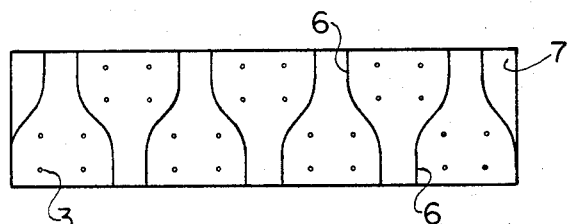
Figure 4:
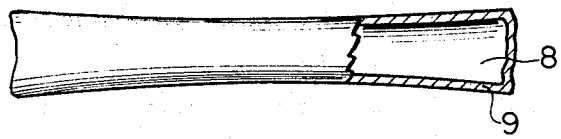

In the annexed drawing, FIGURE 1 is a plan view, on an enlarged scale, of a novel snack food in accordance with the invention; FIG. 2 is a side view of the same product, partly in cross-section; FIG. 3 depicts, on a reduced scale, how a sheet of dough is cut into pieces to form the product of FIGS. 1 and 2. FIG. 4 is a view of another modification of a snack food in accordance with the invention.

At various social gatherings it is customary to serve the guests a flavorsome dip, usually containing cheese or sour cream as its base. Such dips are conventionally consumed by scooping up a quantity thereof with a potato chip, cracker or similar solid snack item, the dip and snack item being then consumed together. One problem in "dipping," as this social activity is often termed, is the inadequacy of known snack products for gathering up substantial quantities of the flavorsome dip. For example, potato chips are brittle and tend to break just when the dipper has secured a plentiful harvest of dip. Items such as pretzel sticks are woefully ineffective because of their narrow and rounded surfaces. Some crackers have sufficient surface area and strength to permit collecting goodly portions of dip but suffer from the disadvantage that they are not really designed for the job and an effective helping of dip usually leads to contact of the dip with the dipper's fingers.

One phase of the present invention is concerned with the provision of a novel snack item which is particularly adapted for effective scooping up of substantial quantities of dip with no likelihood of breaking of the snack item in the dipping process or soiling of the dipper's fingers. Referring now to FIGS. 1 and 2 of the annexed drawing, the novel snack item is a unitary portion of crisp, essentialy-amylaceous material, having a relatively flat blade 1 and a handle 2 of a cylindrical configuration. Blade 1, being flat, serves as an admirable tool for scooping up a desired amount of dip whereas handle 2, because of its cylindrical shape, can be grasped readily so that the dipping instrument can be held securely and with no danger of the dip reaching the fingers of the operator. Moreover, since handle 2 has a cylindrical shape and is an integral part with the blade, it has considerable strength so that there is no possibility of breakage in normal use.

In preparing the snack item of FIGS. 1 and 2, a dough is first prepared. This dough may be of any conventional type such as a cracker dough, plain or flavored as desired with onion, garlic, bacon, or other desired flavor. In a preferred modification of the invention the dough is primarily composed of cooked mashed potatoes as hereinafter described. The dough is rolled out in customary manner, for example, into sheets about $\frac{1}{16}$ inch thick. The sheet of dough is then punched out into paddle-shaped pieces: Obviously the size of the pieces may be varied as desired. FIGURE 3 depicts how the pieces may be cut along lines 6 from a sheet of dough 7 with a minimum of wastage. The pieces of dough are then punched with several small holes in the blade (wide) portion of the pieces—note holes 3 in FIGS. 1 and 3. With a blade about $1\frac{1}{4}"$ x $1\frac{1}{4}"$, four holes about $\frac{1}{16}"$ in diameter give good results; with larger blade sizes, more holes are needed. The cut out and pierced dough pieces are then baked. During baking puffing of the blade portion is restricted by the presence of holes 3 so that this part of the item remains relatively flat and unpuffed. However, no holes being provided in the handle portion, this part of the item puffs up, forming an essentially circular cross-section and hence giving it unusual strength because of the beam or girder effect attained by such increase in cross-sectional area. After baking, the products are cooled and packaged in conventional manner. The extent of puffing in the different portions of the product is particularly evident in FIGURE 2 of the annexed drawing. In this side view of the product, the narrow band or web 4, which is retained after baking, about the periphery of the unit represents essentially the thickness of the dough prior to baking. It is thus evident by comparison with this band that the handle portion 2 is puffed many times more than blade portion 1. The hollow shell structure which results from the puffing is evident from the cut away portion of FIGURE 2 wherein 5 represents the central void formed during the baking operation.

Another phase of the invention concerns the preparation of snack food items which are composed mainly of potatoes. In preparing these products, white potatoes are cooked in conventional manner, for example, steamed for 30 minutes, then mashed. The mashed potatoes are then mixed with potato starch, potato flour, and small amounts of salt, edible gum such as karaya, carragheen, or locust, and shortening. Various flavorings, such as onion, parsley, chives, cheeses, may be incorporated as desired. The resulting dough is rolled out into thin sheets, cut into selected shapes and baked at about 300–400° F. A characteristic of the potato dough is that during baking the products puff, due to formation of steam, and this puffed state is retained so that the final product is a hollow shell of the potato material having a light golden brown color and a crisp texture. Because of this crisp texture and an excellent flavor, the products make an excellent food for snack purposes, for example, as a supplement to soups, cheeses, cold-cuts, etc. As noted above, the potato dough may be cut into any desirable shape prior to baking. Typically, these shapes may be circular, oval, square, rectangular, or triangular. In the preferred modification of the invention, the dough is cut into the paddle shape shown in FIGS. 1 and 3. The potato dough composition is particularly preferred for forming this novel snack item because of the extent to which the dough puffs during baking and the fact that it retains this puff, forming (wherever the dough is unperforated) a hollow shell which provides crispness combined with strength and rigidity, as desired in the handle portion 2 of the snack item. In the snack item depicted in FIGS. 1 and 2 perforations are applied to the dough in the blade portion only so that this part will remain essentially unpuffed. It is, of course, obvious that the principle of perforating can be extended as desired to prepare other forms of finished products having different puffed or unpuffed areas.

EXAMPLES

The invention is further demonstrated by the following examples:

Ingredients:

| | Parts |
|---|---|
| Potatoes (steamed 30 min.) | 200 |
| Potato starch | 100 |
| Potato flour | 20 |
| Salt | 5 |
| Karaya gum | 1 |
| Shortening | 19 |

Method.—The steamed potatoes were mashed in a mechanical mixer for 5 minutes. The starch, flour, salt, and gum were added and mixing was continued for another minute. The shortening was then added and the mixing continued for an additional 5 minutes. The resulting dough was rolled to 1/16-inch thickness, cut into selected shapes (as set forth below) and baked in a forced air dryer at 300° F. for approximately 30 minutes.

Example I

In one run the dough was cut into one-inch squares. The products were golden brown in color with a crisp texture. They had a pillow shape, being a hollow shell of the potato material.

Example II

In another run, the dough was cut into sticks about 1/2" x 3". The products were golden brown in color with a crisp texture. Each stick was puffed up like an elongated pillow, completely hollow, being a crisp shell of the potato material. This product is shown in FIGURE 4 of the annexed drawing. The cut-away portion of the figure shows the central void 8 and the thin shell 9 of potato material.

Example III

In another run the dough was cut into the paddle shape shown in FIGURE 3. The blade part was approximately 1½" x 1½", the handle about 1½" x 3/8". Four small holes were pierced into the blade portion prior to baking. The products had a golden brown color and a crisp texture. The thickness of the products in the blade portion varied from about 1/16" to about 3/16", the handle portion was puffed to a hollow cylindrical shell with a diameter varying from 3/8" to 1/2" in different samples. The structure of the products was as shown in FIGS. 1 and 2.

The specific dough formulation set forth above is subject to modifications as with any other baked product. For example, different varieties of potatoes may require slightly different proportions of potato, potato flour, and potato starch. Potatoes of low solids content (specific gravity approximately 1.075) do not require the addition of water. However, when potatoes of high solids (specific gravity of 1.10 or more) are used, addition of water is necessary. The proper amount of water to add can best be determined by the operator's judgment. In general, enough water is added to yield a dough of slightly sticky consistency. The storage temperature of the potatoes prior to use can have a marked influence on the color and taste of the products. For best results one should use potatoes of low sugar content. If it is necessary to use potatoes which have been kept in cold storage (and consequently are high in sugar) they may be conditioned at higher temperature before use (storage at 70° F. for about 10 days). In such conditioning treatment the sugar content is reduced and the products eventually produced will have a desired golden color and excellent taste. For best results, the potato flour should also be one prepared from potatoes of low sugar content, or, if such is not available, the problem can be overcome by decreasing the amount of flour and increasing the amount of starch in the formulation. The addition of a vegetable gum is necessary to insure the desired puffing effect. Of several gums investigated, karaya gives the best results. Others which may be used are locust or carragheen, which may require slightly different proportions for proper results. Shortening naturally has an effect on the texture of the final product. Without shortening the product is excessively tough; too much shortening may either reduce or prevent puffing during baking. The product has an appealing taste without the addition of other flavors. However, different flavoring materials can readily be added to the dough mix. Typical suitable flavorings are cheese, dehydrated onion or garlic powders, dehydrated chive, etc. A particular advantage of the potato snack foods of the invention is that they are completely free from cereals or cereal derivatives and thus would be especially useful to persons suffering from sensitivity to cereal grains.

Having thus described our invention, we claim:

1. A snack food comprising a unitary portion of essentially-amylaceous material in a baked, crisp condition in the shape of a scoop having an essentially flat blade and an essentially cylindrical hollow handle.

2. The product of claim 1 wherein said amylaceous material is potato.

3. A method for preparing a snack food comprising providing a dough, rolling the dough into a thin sheet, cutting the dough into a blank in the shape of a paddle having a blade section and a handle section, perforating said blank solely in said blade section, baking said perforated dough blank to yield a product which has an essentially flat blade section and a puffed handle section.

4. The process of claim 3 wherein said dough contains mainly potato material.

5. The process of claim 3 wherein said dough contains mashed potatoes, potato flour, potato starch, shortening, salt, and vegetable gum.

6. A snack food product comprising a unitary portion of a dough of mashed potatoes, potato flour, potato starch, shortening, salt, and vegetable gum, baked to a crisp texture and a light golden brown color, being in the shape of a scoop having an essentially flat blade and an essentially cylindrical hollow handle.

References Cited

UNITED STATES PATENTS

| 2,160,902 | 6/1939 | Raymond | 99—100 X |
| 2,905,559 | 9/1959 | Anderson et al. | 99—80 |

FOREIGN PATENTS

| 508,065 | 12/1954 | Canada. |
| 608,996 | 9/1948 | Great Britain. |

A. LOUIS MONACELL, *Primary Examiner.*

D. M. NAFF, *Assistant Examiner.*